US008591479B2

(12) United States Patent
Boissonneault et al.

(10) Patent No.: US 8,591,479 B2
(45) Date of Patent: Nov. 26, 2013

(54) GRAVITY-FED STERILE EYEWASH STATION WITH FLOAT VALVE FLOW REGULATOR

(75) Inventors: Raymond Allen Boissonneault, Upton, MA (US); Kelli Piotti, Rumford, RI (US)

(73) Assignee: Honeywell International Inc., Morristown, NJ (US)

( * ) Notice: Subject to any disclaimer, the term of this patent is extended or adjusted under 35 U.S.C. 154(b) by 63 days.

(21) Appl. No.: 13/306,751

(22) Filed: Nov. 29, 2011

(65) Prior Publication Data

US 2012/0330251 A1 Dec. 27, 2012

Related U.S. Application Data

(60) Provisional application No. 61/500,641, filed on Jun. 24, 2011.

(51) Int. Cl.
*A61M 5/14* (2006.01)
*A61M 35/00* (2006.01)
*A61H 33/00* (2006.01)
*A61H 33/04* (2006.01)

(52) U.S. Cl.
USPC .............................. 604/254; 604/294; 4/620

(58) Field of Classification Search
USPC ..................... 604/246, 251, 254, 294–300; 4/619–620, 624–627; 137/430, 505.4; 222/67, 69, 105, 183, 185.1, 481.5
See application file for complete search history.

(56) References Cited

U.S. PATENT DOCUMENTS

| 3,151,776 | A | * | 10/1964 | Grimm ............................ 222/67 |
| 3,629,876 | A | | 12/1971 | Wright |
| 3,809,315 | A | | 5/1974 | Wright |
| 3,963,024 | A | * | 6/1976 | Goldowsky .................... 604/254 |
| 4,793,514 | A | * | 12/1988 | Sheets ............................... 222/67 |
| 5,216,765 | A | | 6/1993 | Paterson et al. |
| 6,205,599 | B1 | | 3/2001 | Anders |
| 6,296,626 | B1 | | 10/2001 | Stein |
| 6,520,431 | B2 | | 2/2003 | Donovan |
| 7,011,652 | B1 | | 3/2006 | Berke |
| 7,240,854 | B2 | | 7/2007 | Taylor |
| 2007/0089233 | A1 | | 4/2007 | Smith |

* cited by examiner

*Primary Examiner* — Jackie Ho
*Assistant Examiner* — Mark K Han
(74) *Attorney, Agent, or Firm* — Barlow, Josephs & Holmes, Ltd.

(57) ABSTRACT

A gravity-fed, emergency eyewash station includes a flow regulator in the feed line between the solution bag and the dispensing nozzle to maintain a constant flow rate throughout the entire activation time frame. The flow regulator uses a float valve to variably open and close an orifice that feeds the dispensing nozzle. Solution enters the flow regulator from an orifice at the top and leaves from an opening at the bottom. Solution flowing into and out of the regulator quickly reaches an equilibrium state, resulting in a constant flow rate for the entire activation time frame.

3 Claims, 14 Drawing Sheets

GRAVITY-FED STERILE EYEWASH STATION WITH FLOAT VALVE FLOW REGULATOR

This application claims the benefit of U.S. Provisional Application No. 61/500,614, filed Jun. 24, 2011

BACKGROUND

The present application relates generally to an emergency eyewash station, and more particularly to a portable, gravity-fed emergency eyewash station having a flow regulator to maintain a constant flow rate of sterile eyewash solution throughout a required 15 minute activation time frame.

ANSI standards require eyewash stations to deliver eyewash solution at a flow rate of 1.5 liters per minute for 15 minutes. There is a need in multiple industries for an eyewash station that is both portable and can deliver a sterile eyewash solution at a constant steady rate of 1.5 liters per minute as required by the ANSI standard.

SUMMARY

An improved gravity-fed eyewash station includes a dispensing nozzle, a solution bag containing a sterile eyewash solution, and a flow conduit connecting the solution bag and the dispensing nozzle. The nozzle includes an O-ring seal and a breakaway cover. The solution bag is located above the dispensing nozzle where head pressure of the eyewash solution within the solution bag creates a gravity-fed flow of the eyewash solution through the flow conduit to the dispensing nozzle. The eyewash station further includes a novel flow regulator disposed within the flow conduit to maintain a constant flow rate of the eyewash solution.

The solution bag and flow regulator are contained within a portable housing while the dispensing nozzle is located on a door that is pivoted from an upright closed position to an activated prone position.

The flow regulator comprises a float valve including a valve body having an upper inlet orifice connected to the solution bag and a lower outlet opening connected to the dispensing nozzle. The float valve further includes a float having a valve stem at an upper end thereof. The float moves within the valve body between a lower open position and an upper position where the valve stem interacts with the inlet orifice to regulate flow.

In operation, when the door is lowered to the active position, and the nozzle cover is removed, solution begins to flow. Solution enters the valve body through the upper inlet orifice and exits through the lower outlet opening. The float rises and falls with a level of the solution flowing through the valve body. The valve stem cooperates with inlet orifice to maintain a steady flow of solution into the valve body and outward to the dispensing nozzle.

All of the components are configured and arranged so as to provide and maintain the minimum ANSI flow rate of 1.5 liters per minute for 15 minutes.

In order for the flow regulator to properly operate, there needs to be a variable air pocket within the valve body to allow the float to move up and down. However, in order to maintain sterility of the eyewash solution, the air pocket cannot be vented to ambient air. The present eyewash station addresses this issue by creating a volume of sterile air above the sterile eyewash solution within the solution bag, and providing the float valve with an air tube connecting the valve body and the volume of sterile air within the solution bag. Accordingly, air flows freely through the tube between the sterile volume of air and the variable air pocket allowing the float to rise and fall with the level of the eyewash solution without introducing any outside air.

Accordingly, an objective is to provide an eyewash station that is both portable and can deliver a sterile eyewash solution at a constant steady rate of 1.5 liters per minute as required by the ANSI standard.

Other objects, features and advantages shall become apparent as the description thereof proceeds when considered in connection with the accompanying illustrative drawings.

BRIEF DESCRIPTION OF THE DRAWING FIGURES

An exemplary embodiment will now be described further by way of example with reference to the following examples and figures, which are intended to be illustrative only and in no way limiting upon the scope of the disclosure.

DETAILED DESCRIPTION OF AN EXEMPLARY EMBODIMENT

Figure 1:
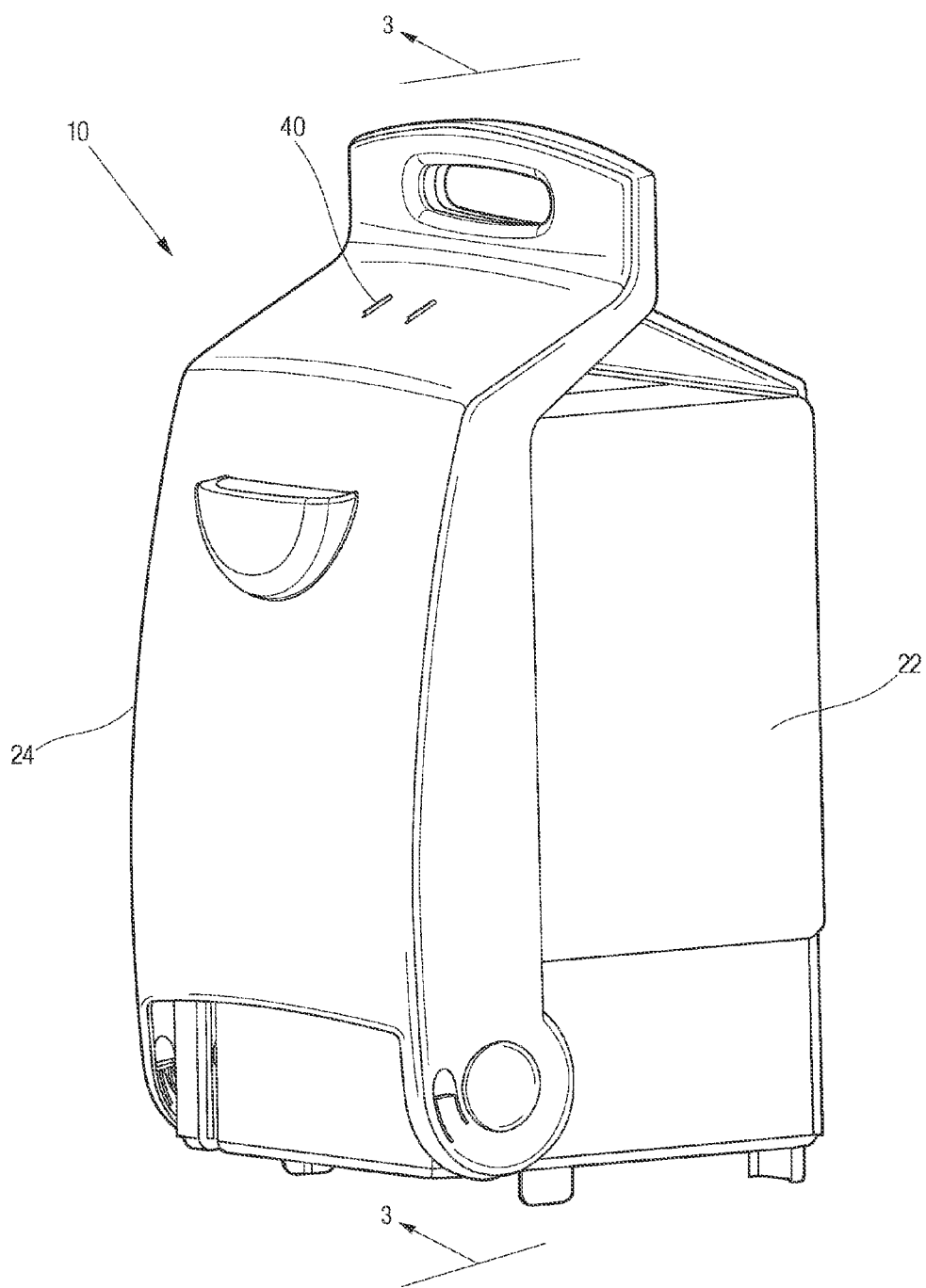
FIG. 1 is a perspective view of the eyewash station.

Generally, an improved gravity-fed sterile eyewash station 10 as illustrated and described herein includes a dispensing nozzle 12, a solution bag 14 containing a sterile eyewash solution 16, and a flow conduit 18 connecting the solution bag 14 and the dispensing nozzle 12. The eyewash station 10 includes a flow regulator 20 to maintain a steady flow rate of the solution 16 through the flow conduit 18. The eyewash station 10 is designed to maintain sterility of the solution 16 over the normally expected shelf life of the solution.

Figure 2:
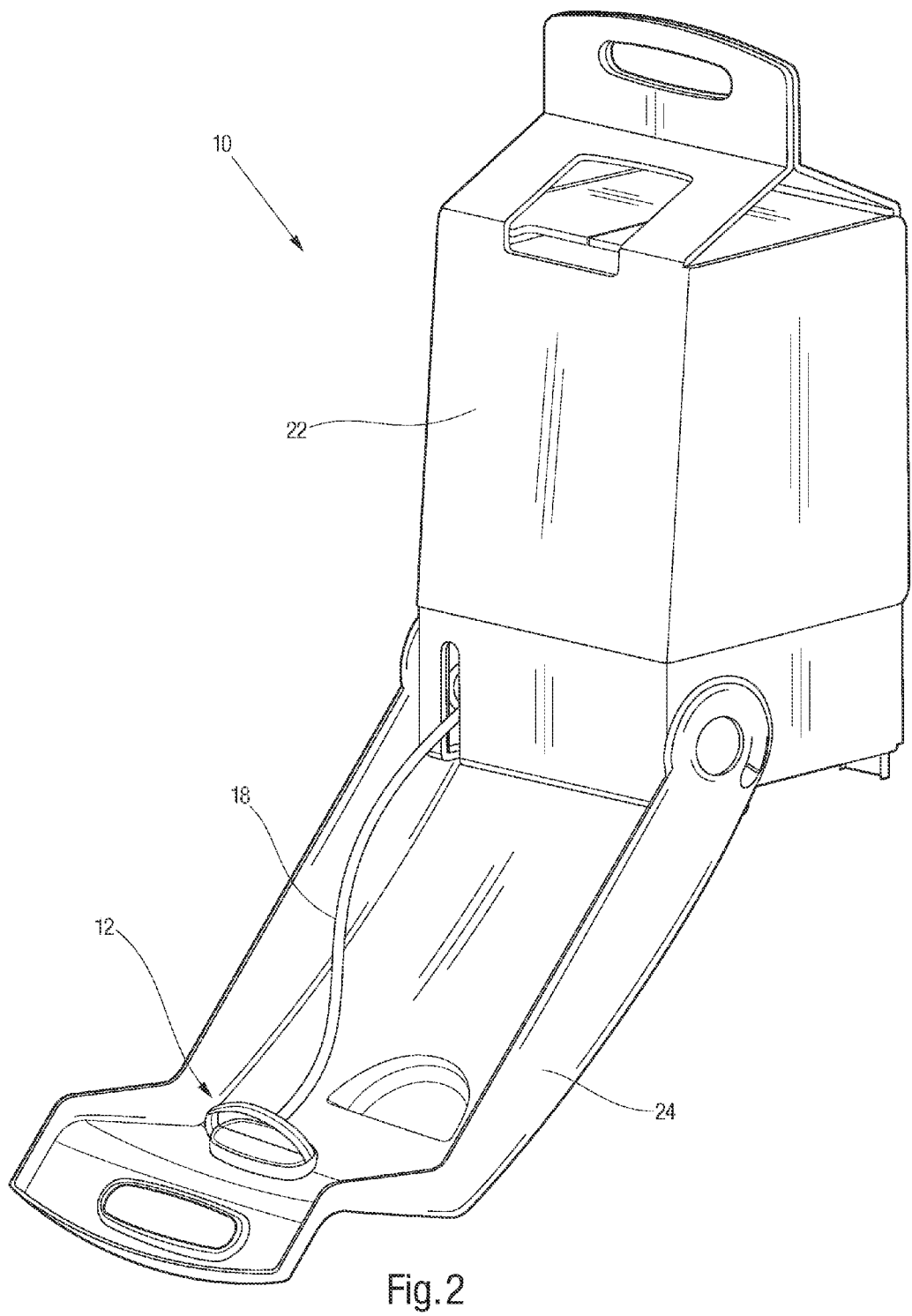
FIG. 2 is another perspective view with the nozzle positioning door in the open position.

The solution bag 14, flow conduit 18 and flow regulator 20 are contained within a portable housing assembly 22 while the dispensing nozzle 12 is located on a door 24 that is pivoted from an upright closed position (FIG. 1) to an activated prone position (FIG. 2).

Referring to FIGS. 3, and 11-14, the dispensing nozzle 12 includes a body portion 26 with an inlet coupling 28, a spray head 30, an O-ring seal 32 on the peripheral edge of the spray head 30 and a breakaway cover 34. The body portion 26 includes flexible tabs 36 that are snap received into complementary slots 38 in the door 24 (see FIG. 3). The cover 34 includes breakaway tabs 40 that are received in slots 42 in the spray head 30 to hold the cover 34 in assembled relation with the spray head 30 until the cover 34 is affirmatively pulled away. The inner surfaces of the breakaway cover 34 engage with the O-ring 32 to provide a seal to maintain sterility of the solution 16 within the system (see FIG. 14).

The solution bag 14 is located above the dispensing nozzle 12 where the head pressure of the eyewash solution 16 within the solution bag 14 creates a gravity-fed flow of the eyewash solution 16 through the flow conduit 18 to the dispensing nozzle 12. The solution bag 14 comprises a flexible plastic material configured for optimal displacement and capacity within the housing 22. The bag 14 is filled using a system that maintains the sterility of inside of the bag 14 and the solution 16 during the filling process.

Figure 9:
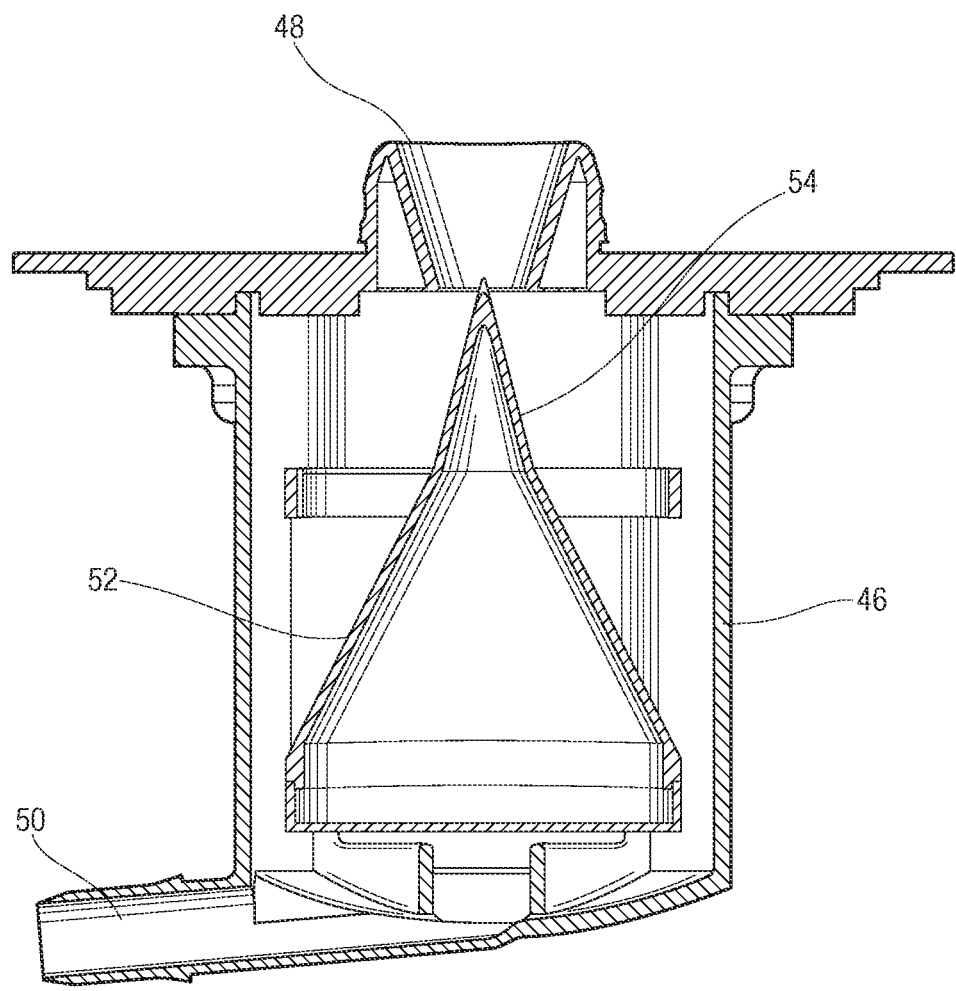
FIG. 9 is a cross-sectional view of the flow regulator with the float in the lower position.
Figure 10:
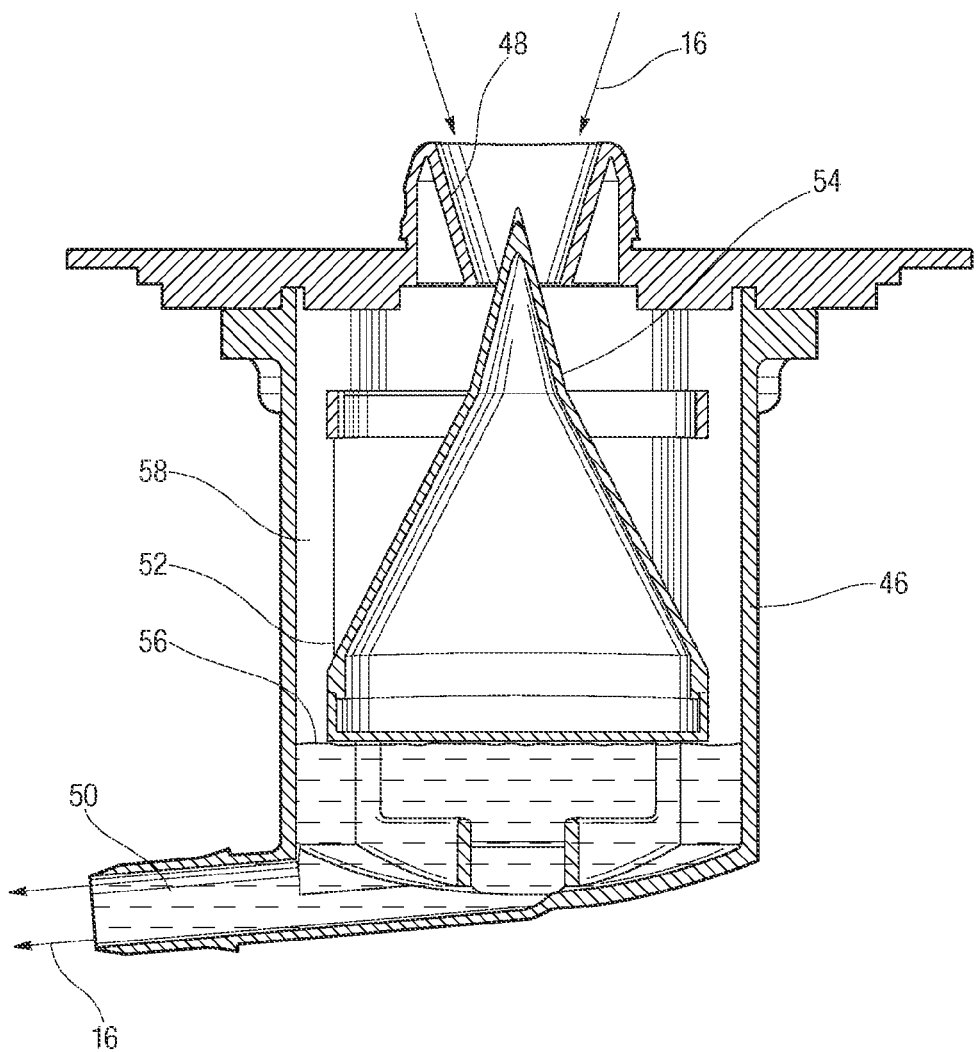
FIG. 10 is another cross-sectional view of the flow regulator with the float in an upper position.
Figure 11:
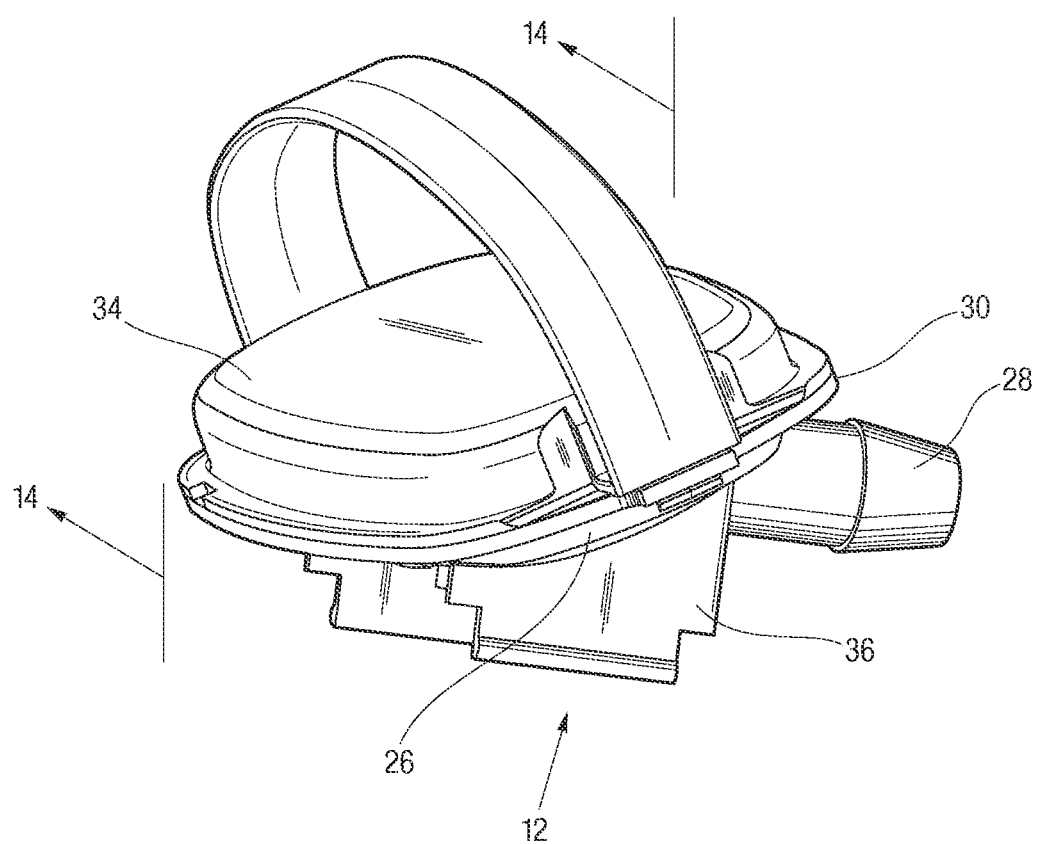
FIG. 11 is a perspective view of the dispensing nozzle.
Figure 12:
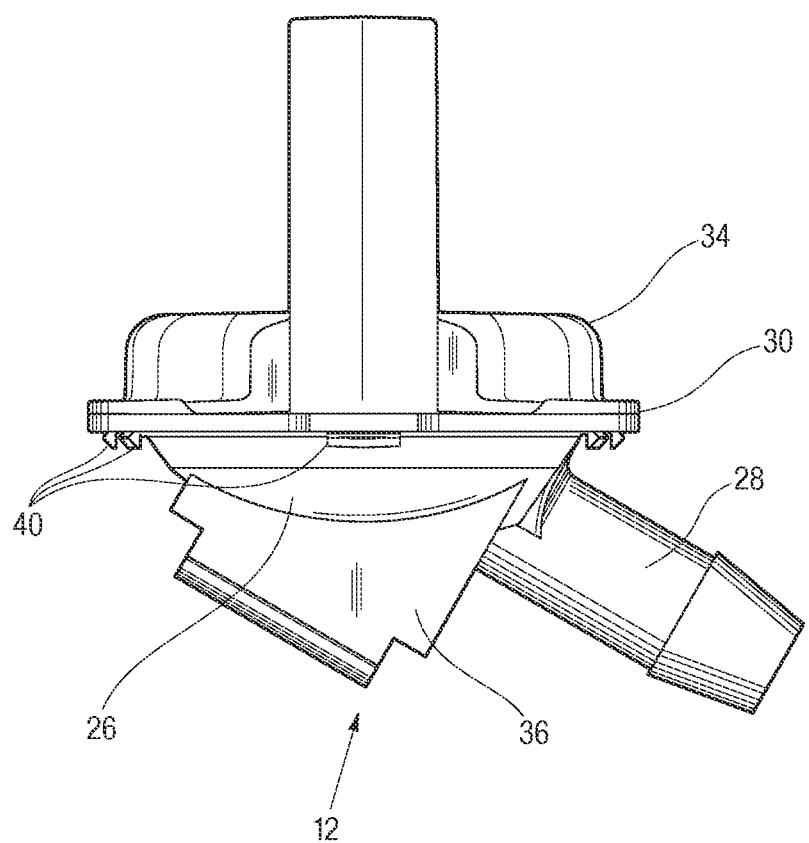
FIG. 12 is a side view thereof.
Figure 13:
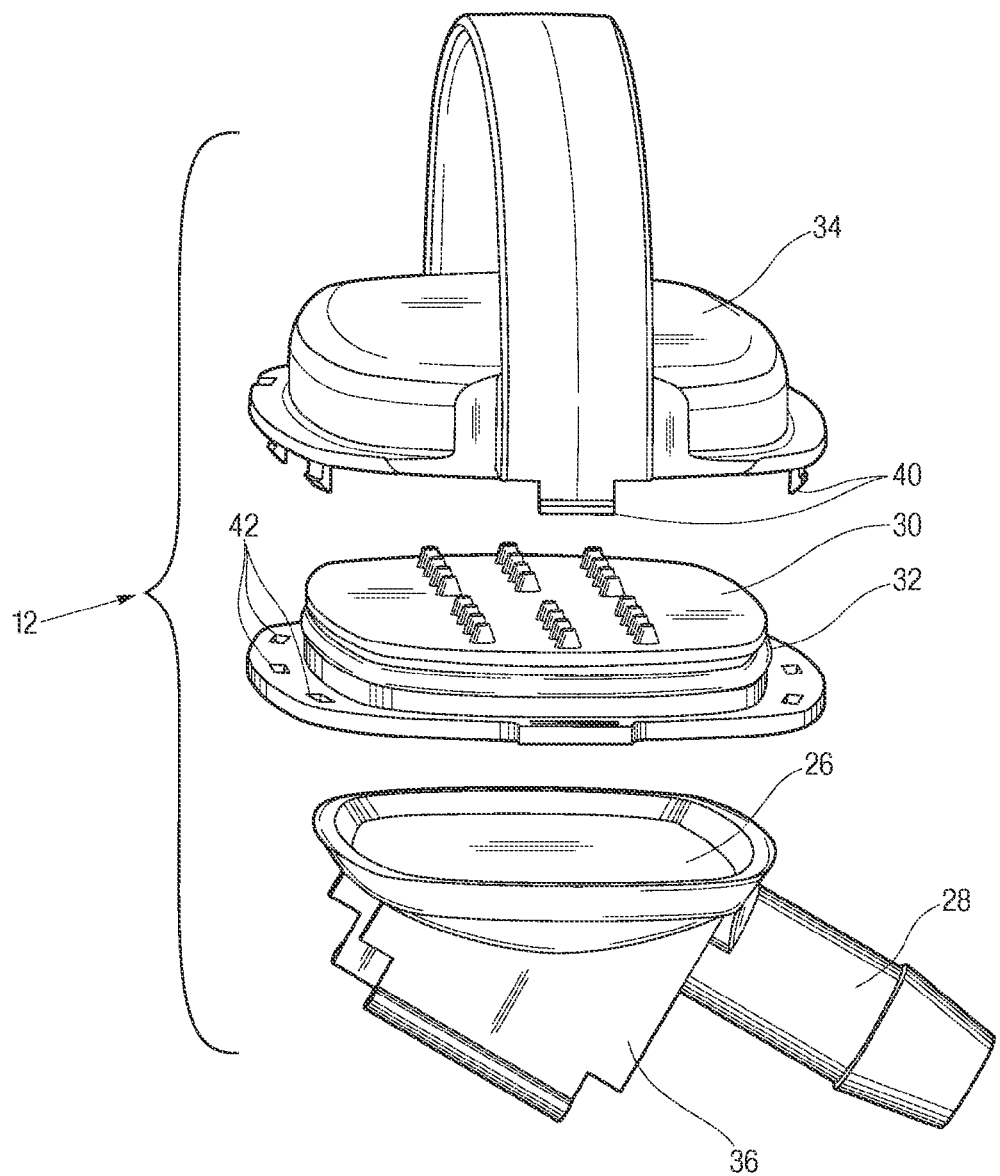
FIG. 13 is an exploded perspective view thereof.
Figure 14:
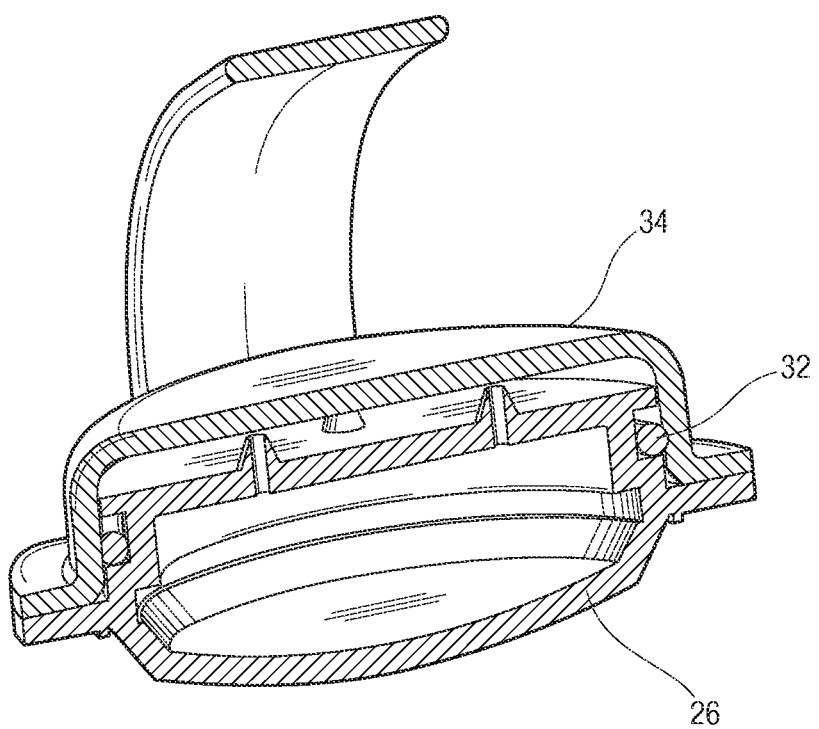
FIG. 14 is a cross-sectional view thereof taken along line 14-14 of FIG. 11

Connected to the bottom end of the bag 14 is a flow regulator 20 (FIGS. 5-10) (float valve), that is configured and arranged to maintain a constant flow rate of the eyewash solution 16 to the nozzle 12. The flow regulator 20 and bag 14 are supported on an internal platform 44 which is in turn supported within the housing 22. The flow regulator 20 comprises a float valve generally including a valve body 46 having an upper inlet orifice 48 connected to the solution bag 14 and a lower outlet opening (coupling) 50 connected by flexible tubing conduit 18 to the inlet coupling 28 of the dispensing nozzle 12. The regulator 20 (float valve) further includes a buoyant, hollow float 52 having a valve stem 54 at an upper end thereof. The float 52 moves within the valve body 46 between a lower open position (See FIG. 9) and an upper position (See FIG. 10) where the valve stem 54 interacts with the inlet orifice 48 to regulate flow.

In operation, when the door 24 is lowered to the active position (See FIG. 2), and the nozzle cover 34 is removed, the nozzle 12 is positioned below the solution bag 14, and solution 16 begins to flow from the solution bag 14 due to gravity (head pressure). Solution 16 enters the valve body 46 through the upper inlet orifice 48 and exits through the lower outlet opening 50. The buoyant float 52 rises and falls with a level 56 of the solution 16 within the valve body 46 (See FIG. 10) and the valve stem 54 cooperates with inlet orifice 48 to maintain a steady flow of solution 16 into the valve body 46 and to the dispensing nozzle 12.

All of the components of the eyewash station 10 are sized and configured so as to provide and maintain the minimum ANSI flow rate of 1.5 liters per minute rate for 15 minutes.

Figure 3:
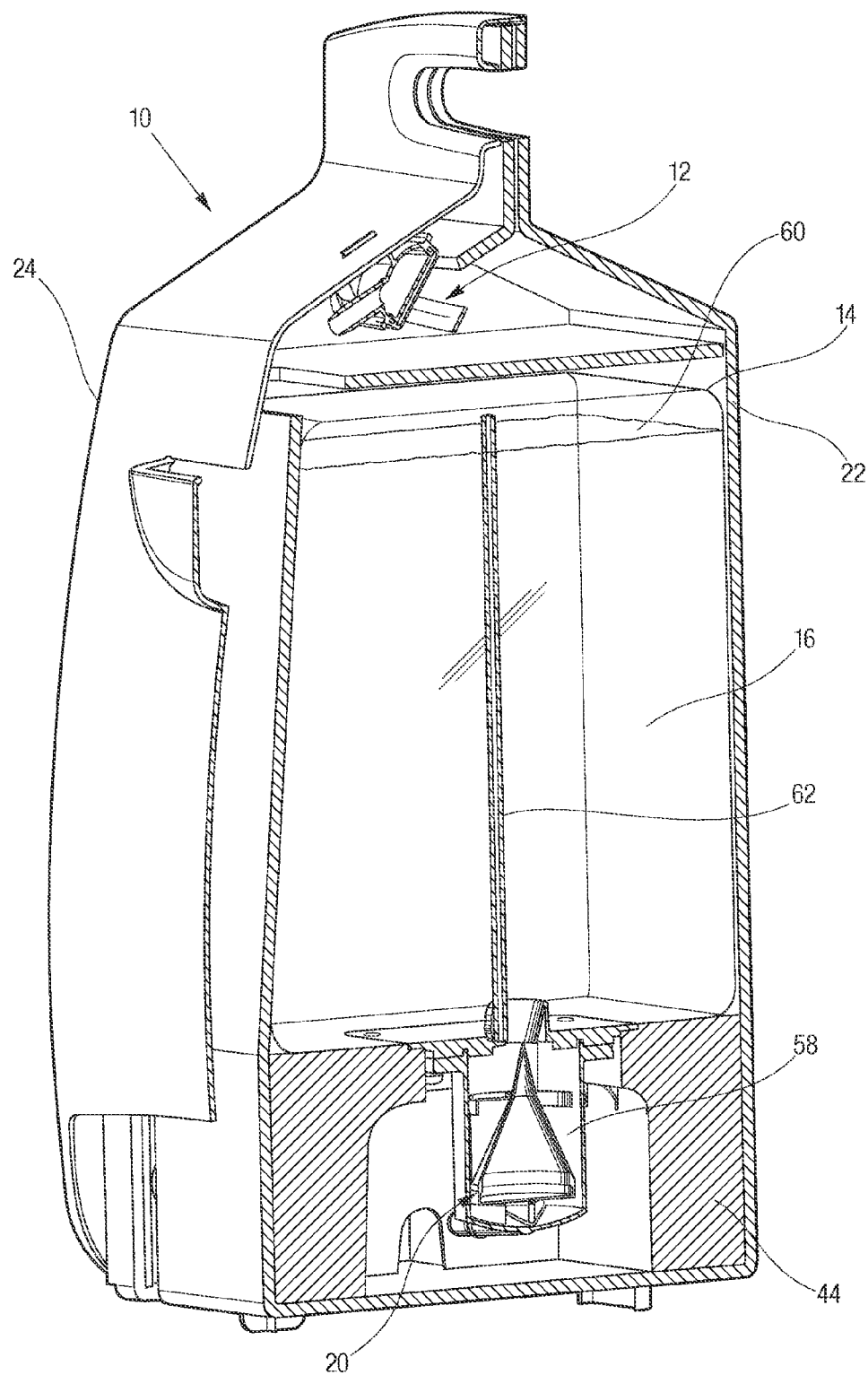
FIG. 3 is a cross-sectional view of the eyewash station taken along line 3-3 of FIG. 1.
Figure 4:
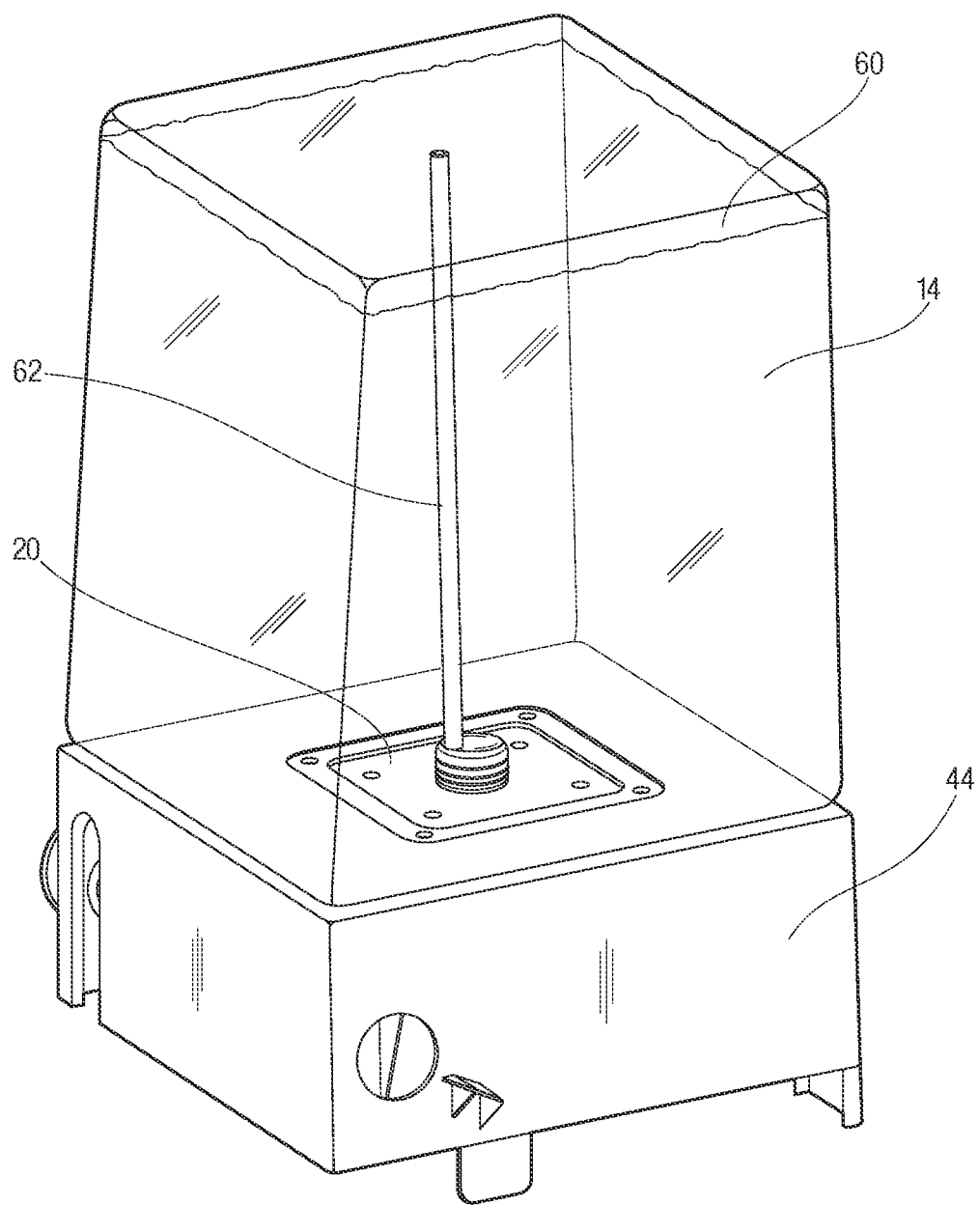
FIG. 4 is a perspective view of the solution bag, bag support platform and flow regulator.
Figure 5:
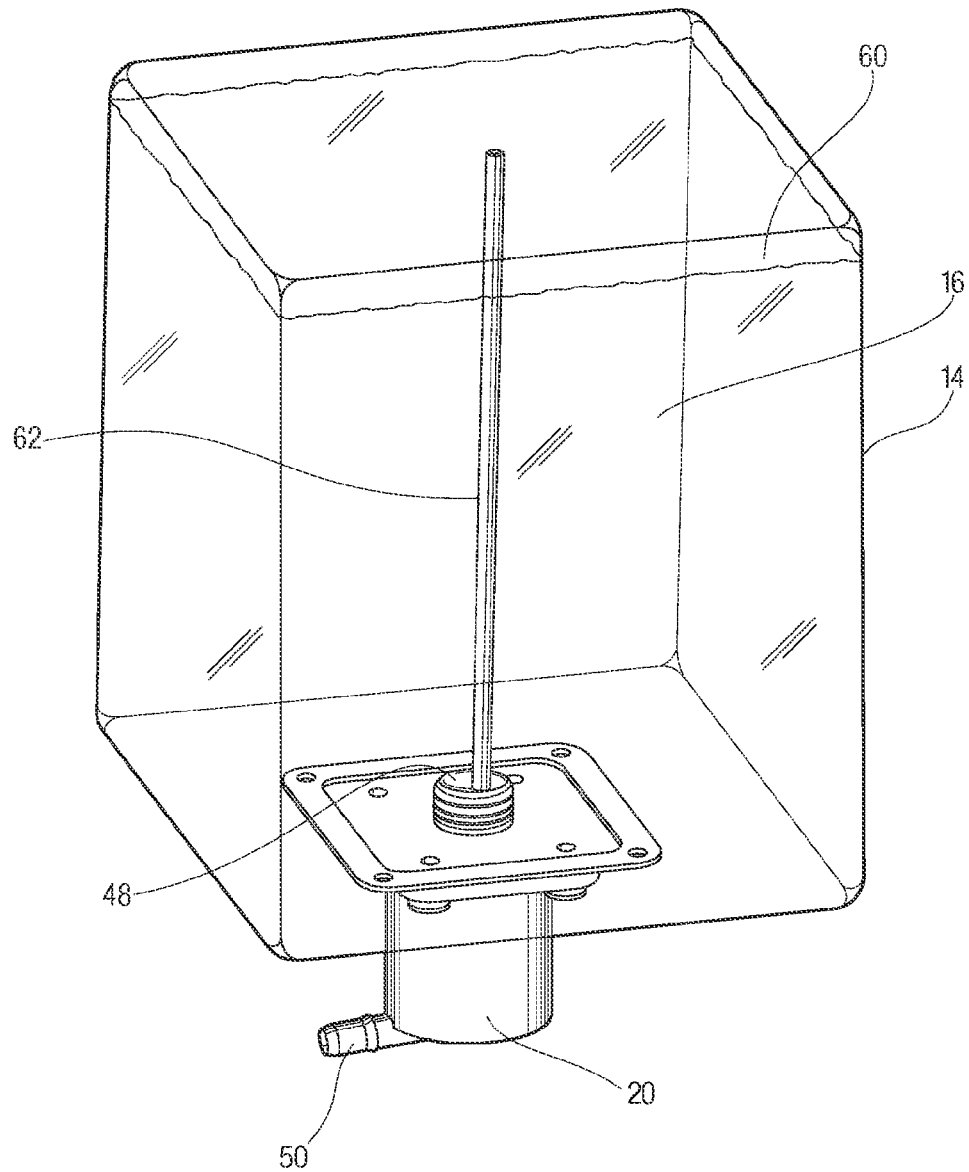
FIG. 5 is a perspective view of the solution bag and flow regulator.
Figure 6:
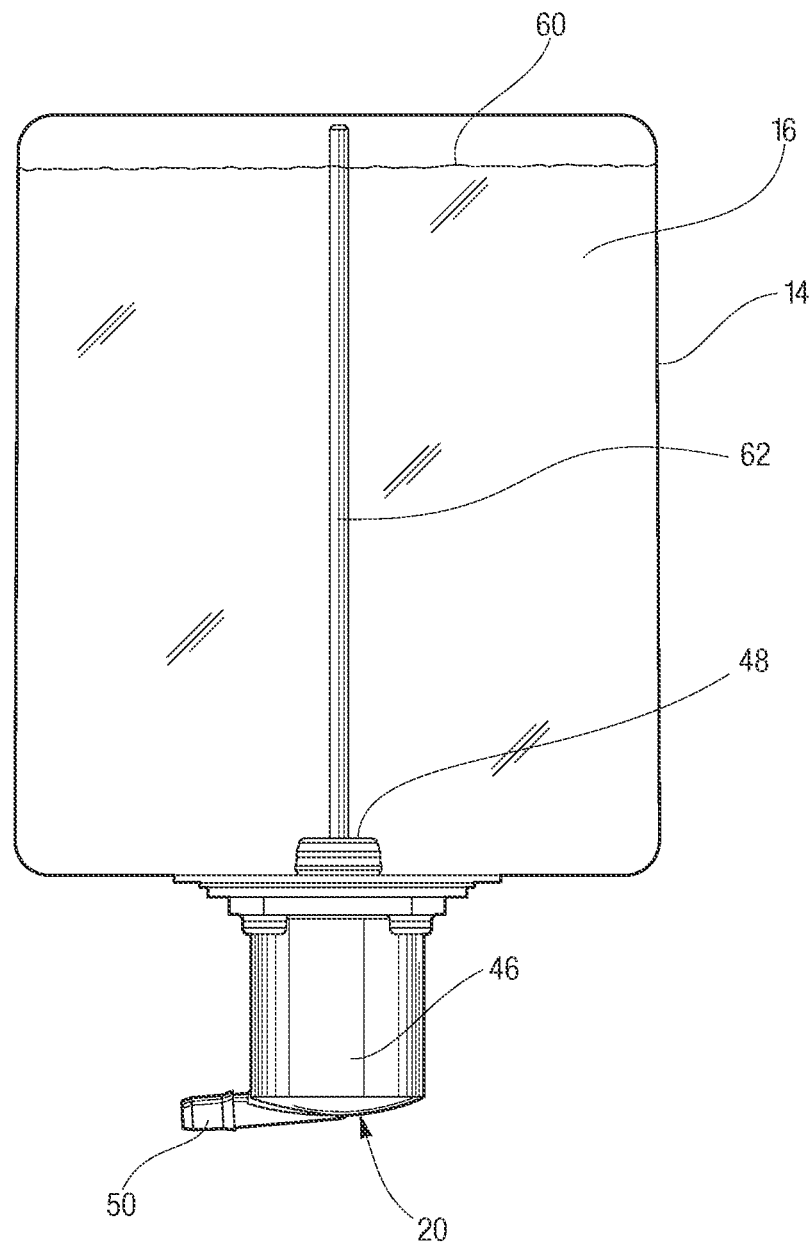
FIG. 6 is a side view thereof.
Figure 7:
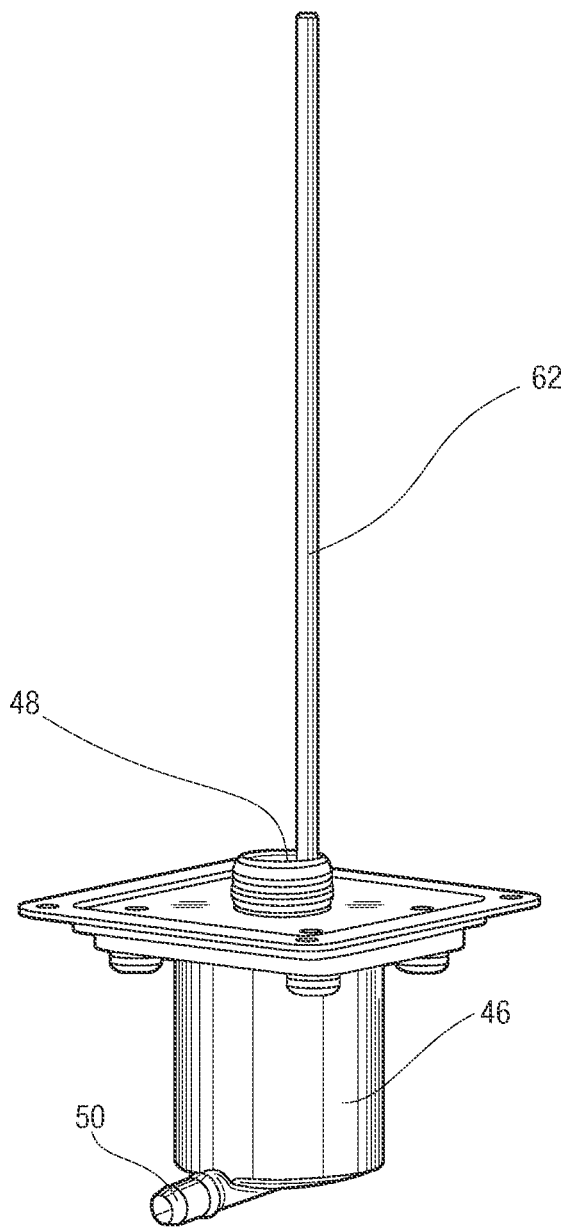
FIG. 7 is a perspective view of the flow regulator
Figure 8:
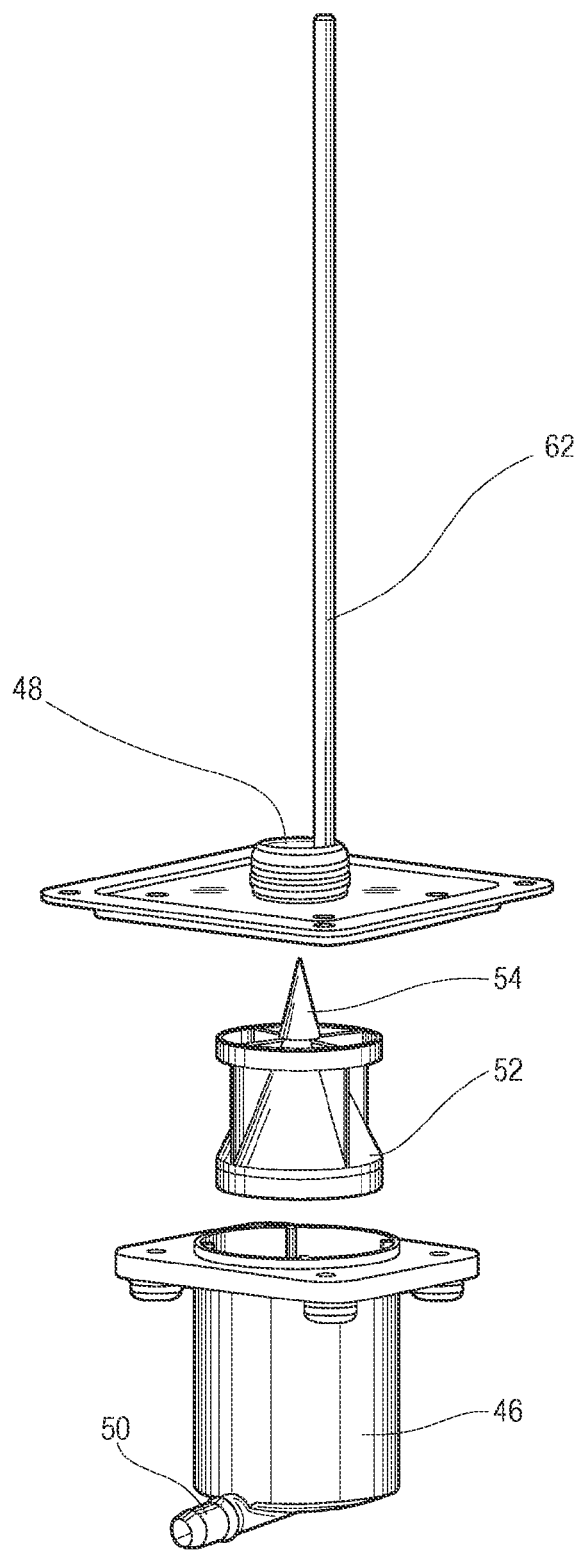
FIG. 8 is an exploded perspective view of the flow regulator.

Turning to FIGS. 3, 5 and 6, in order for the flow regulator 20 to properly operate, there needs to be a variable air pocket 58 within the valve body 46 to allow the float 52 to move up and down (FIG. 3). However, in order to maintain sterility of the eyewash solution 16, the air pocket 58 cannot be vented to ambient air. The present eyewash station 10 addresses this issue by creating a volume of sterile air 60 above the sterile eyewash solution 16 (FIGS. 3 and 6), and providing the float valve 20 with an air tube 62 connecting the valve body 46 and the volume of sterile air 60 within the solution bag 14. Air flows freely through the tube 62 between the sterile volume of air 60 and the variable air pocket 58 allowing the float 52 to rise and fall with the level 56 of the eyewash solution without introducing any outside air.

For these reasons, the present gravity-fed sterile eyewash station 10 is believed to represent a significant advancement in the art, which has substantial commercial merit.

While there is shown and described herein certain specific structure embodying the eyewash station, it will be manifest to those skilled in the art that various modifications and rearrangements of the parts may be made without departing from the spirit and scope of the underlying concepts and that the same is not limited to the particular forms or embodiments herein shown and described except insofar as indicated by the scope of the appended claims.

What is claimed is:

1. A gravity-fed emergency eyewash station comprising:
a dispensing nozzle;
a solution bag containing a sterile eyewash solution;
a flow conduit connecting said solution bag and said dispensing nozzle,
said solution bag being located above said dispensing nozzle such that head pressure of said sterile eyewash solution within said solution bag creates a gravity-fed flow of said sterile eyewash solution through said flow conduit to said dispensing nozzle; and
a flow regulator disposed within said flow conduit to maintain a constant flow rate of said sterile eyewash solution;
said flow regulator comprising a valve body and a float,
said flow regulator containing a variable air pocket within said valve body, said solution bag containing a volume of sterile air above said sterile eyewash solution, said flow regulator further including an air tube connecting said valve body and said volume of sterile air within said solution bag;
whereby said tube is adapted to allow air to flow freely therethrough between said sterile volume of air and said variable air pocket allowing said float to rise and fall with the level of said sterile eyewash solution without introducing outside air.

2. The gravity-fed emergency eyewash station of claim 1 wherein said valve body includes an upper inlet orifice connected to said solution bag and a lower outlet opening connected to said dispensing nozzle, said float further including a valve stem at an upper end thereof, said float movable within said valve body between a lower position and an upper position,
wherein said sterile eyewash solution is capable of entering said valve body through said upper inlet orifice and exiting through said lower outlet opening, said float rising and falling with the level of said sterile eyewash solution within said valve body such that said valve stem cooperates with said upper inlet orifice to maintain a steady flow of said sterile eyewash solution into said valve body.

3. A gravity-fed emergency eyewash station comprising:
a dispensing nozzle;
a solution bag containing a sterile eyewash solution;
a flow conduit connecting said solution bag and said dispensing nozzle,
said solution bag being located above said dispensing nozzle such that head pressure of said sterile eyewash solution within said solution bag creates a gravity-fed flow of said sterile eyewash solution through said flow conduit to said dispensing nozzle; and
a flow regulator disposed within said flow conduit to maintain a constant flow rate of said sterile eyewash solution,
said flow regulator comprising a valve body and a float, said flow regulator containing a variable air pocket within said valve body, said solution bag containing a volume of sterile air above said sterile eyewash solution, said flow regulator further including an air tube connecting said valve body and said volume of sterile air within said solution bag;
whereby said tube is adapted to allow air to flow freely therethrough between said sterile volume of air and said variable air pocket allowing said float to rise and fall with the level of said sterile eyewash solution without introducing outside air;
said valve body includes an upper inlet orifice connected to said solution bag and a lower outlet opening connected to said dispensing nozzle, said float further including a valve stem at an upper end thereof, said float movable within said valve body between a lower position and an upper position;

wherein said sterile eyewash solution is capable of entering said valve body through said upper inlet orifice and exiting through said lower outlet opening, said float rising and falling with the level of said sterile eyewash solution within said valve body such that said valve stem cooperates with said upper inlet orifice to maintain a steady flow of said sterile eyewash solution into said valve body.

\* \* \* \* \*